(12) United States Patent
Rees et al.

(10) Patent No.: US 7,936,079 B2
(45) Date of Patent: May 3, 2011

(54) DISTRIBUTED SYSTEM OF ELECTRICAL GENERATORS UTILIZING WIND DRIVEN NATURAL MOTION OF TREES

(76) Inventors: Howard David Rees, Yardley, PA (US); Michael J Faigen, Lawrenceville, NJ (US)

(*) Notice: Subject to any disclaimer, the term of this patent is extended or adjusted under 35 U.S.C. 154(b) by 393 days.

(21) Appl. No.: 12/043,938

(22) Filed: Mar. 6, 2008

(65) Prior Publication Data

US 2009/0224539 A1    Sep. 10, 2009

(51) Int. Cl.
*F03D 5/00* (2006.01)
(52) U.S. Cl. .......................................... 290/55
(58) Field of Classification Search ............... 290/1 R
See application file for complete search history.

(56) References Cited

U.S. PATENT DOCUMENTS

| | | | | |
|---|---|---|---|---|
| 6,825,574 | B1 * | 11/2004 | Mooring ................. | 290/1 R |
| 7,043,904 | B2 * | 5/2006 | Newman ................. | 60/398 |
| 7,466,032 | B2 * | 12/2008 | Wadle et al. ........... | 290/1 R |
| 7,667,340 | B2 * | 2/2010 | Wadle et al. ........... | 290/1 R |
| 2009/0266267 | A1 * | 10/2009 | Moss ....................... | 104/53 |
| 2009/0285668 | A1 * | 11/2009 | Labrecque ............... | 415/8 |

FOREIGN PATENT DOCUMENTS

| | | | |
|---|---|---|---|
| DE | 4422309 A1 * | 2/1996 | |
| DE | 19924506 A1 * | 11/2000 | |
| GB | 2346655 A * | 8/2000 | |
| JP | 05064418 A * | 3/1993 | |

\* cited by examiner

*Primary Examiner* — Joseph Waks (57) ABSTRACT

A distributed system of electrical generators utilizing wind driven natural motion of trees includes pull-retract generators deriving torque from the back and forth swaying of neighboring trees and cables, wherein one set of cables acting as support and the other acting as a spring-tensioned flexible rack that drives the pinion gear of the pull-retract generator and also supports the pull-retract generator between the trees. The cables are attached to the pull-retract generators and provide the tension required to support and retract the pull-retract generator mechanism. Tree saddles attach the pull-retract generator cabling to the trees. As the trees sway independently the separations between the trees fluctuate periodically and the pull-retract generators convert these fluctuations into rotational forces that drive the generators. The pull-retract generators make use of a flexible rack and pinion design to convert the relative tree motion into torque and achieves the requisite RPM by cascading a sequence of large-small gear pairs, one such pair in each pull-retract generator utilizing a one-way clutch torque converter, ultimately meshing with a small gear on the generator shaft. Springs are used to return the pull-retract generators to their neutral positions when the trees are stationary and maintain cable tautness when the tree separation periodically lessens by tensioning the rack and pinion cable. The electrical energy derived from the asynchronous motions of the trees, is independent of the direction of the wind and is integrated with other pull-retract generators through rectifiers and to external electrical systems through the use of existing technologies that regulates, conditions and controls the electrical output.

7 Claims, 8 Drawing Sheets

DISTRIBUTED SYSTEM OF ELECTRICAL GENERATORS UTILIZING WIND DRIVEN NATURAL MOTION OF TREES

CROSS-REFERENCE TO RELATED APPLICATIONS

NONE

FEDERALLY SPONSORED RESEARCH

NONE

SEQUENCE LISTING

NONE

FIELD OF THE INVENTION

The present invention relates to the design of a renewable energy system that comprises distributed networks of electrical generators which derive their power from the natural, wind driven swaying of trees.

BACKGROUND OF THE INVENTION

Energy comes in many forms and is stored in many guises. There are chemical (carbon/oxygen and hydrogen/oxygen), nuclear (fission and fusion), photo-voltaic (solar cells) and mechanical (wind, hydro-electric and geothermal) sources of energy, and people have made use of them all. Most energy sources are used to provide either electrical or mechanical power and for each there is a price to pay. Some conversion processes are more efficient than others, some are more suitable for large scale industrial or regional applications than others but almost all have environmental impacts. This invention, a distributed system of electrical generators utilizing wind driven natural motion of trees (henceforth referred to as e-Trees), represents a new and strikingly novel technology for producing electrical power in conditions where conventional (both renewable and non-renewable) alternatives are too expensive or problematic to be commercially or environmentally viable.

e-Trees makes use of the natural and persistent mechanical motion of trees to produce electricity. Once one understands the potential of this approach it is forevermore impossible to look at gently swaying trees on wooded land without imagining its potential to produce power from that motion. The principle is simple. Trees, when subjected to wind will naturally sway back and forth. Like a spring subjected to a driving force trees will undergo periodic motions (they will sway) as they are subjected to the winds' forces. As no two trees are identical, no two trees will sway in exactly the same way, i.e., with the same frequency and phase even when subjected to the same driving force. Trees are also massive, carbon-rich organisms and so serve as very effective sequesters of carbon. Trees' motions are essentially unstoppable and regular (essentially periodic) and therefore deriving power from them is possible even when the motion is very slight (just a few inches is sufficient—small, powerful motions can be "ratcheted up" to yield the necessary torque to drive conventional generators). e-Trees harness the immutable, essentially independent periodic motion of trees to produce electricity. By interconnecting neighboring trees on a wooded plot of land, suspending between the trees small pull-retract generators (PRGs) one can convert the constant, independent small swaying motions of the trees, regardless of the wind direction, into electricity. Each PRG is connected, through a rectifier for DC generators to insure no current flows backwards into the PRG, to local controllers (conditioners and inverters) so as to regulate their output and to convert it into AC or DC (as needed) of the proper voltage so that it can be integrated with other systems.

e-Tree farms (many "harnessed" trees) produce electricity naturally. They have very minimal impact on the environment, both esthetically and ecologically. And, they can be located at almost any windy place where there are tall trees (or where one can plant trees)—from residential neighborhoods to remote mountain ridges. A significant cost and drawback to conventional wind turbine technology is the need to find cleared land, away from bird and bat habitats and not too close to people. The problematic effects of modern industry on the atmospheric levels of greenhouse gases like carbon dioxide are profound, and the clearing of trees and the destruction of otherwise natural ecosystems required for the installation of conventional turbine projects contributes to those problems even as the wind turbine technology produces clean energy. e-Tree farms on the other hand promote the planting of trees, and as each tree acts like a giant wick soaking up atmospheric carbon this approach to generating electricity is doubly beneficial. This object of this patent application provides power and at the same time benefits the environment. e-Trees installations promote the planting of trees (and hence, carbon sequestration) and produce electricity. Some trimming and thinning of wooded properties often needs to be done to achieve the most efficient e-Tree installation, but this is often beneficial to the trees and to the forest ecosystem.

Theoretically, e-Tree farm output is proportional to the area of e-Tree farm (related to the number of PRGs), and like wind turbine technology is an increasing function of the wind speed, turbulent or uni-directional. Conventional turbines require slowly varying or uni-directional persistent winds and they are manufactured with the limited ability to rotate their position as the wind speed and direction changes. In contrast, e-Trees function in either persistent or turbulent winds. In fact, turbulent wind patterns will typically produce more relative tree motion and hence produce more electrical yield. As an e-Tree installation ages or as wind patterns change (a likely scenario if global warming continues to progress), the PRGs can be removed or re-positioned to take advantage of the changes. Conventional turbine installations do not support that sort of adaptation. e-Trees typically complement, rather than compete with, conventional wind turbine technologies.

The optimal design of an e-Tree installation is a complex process. For instance, the mathematical models estimating yield can not incorporate all of the natural detail of a stand of trees, manufactured by nature and not a man-made process with uniform specifications and control, which naturally includes different species of trees and trees of varying ages. The optimal placement of the PRGs (e.g., at what height they should be hung and between which trees they should be suspended) on land supporting different species of trees and for different wind profiles must be determined empirically. Because e-Tree farms can cover large parcels of land, e-Tree farms must often manage the transmission line attenuation problem. Large e-tree farms can extend over many acres and that means that the power lines that carry the electricity to the user (e.g., the regional or local electrical grid) will necessarily be long. Power lines loose power (owing to the resistance present in the power line) and it is certainly possible for there to be significant loss to an e-Tree farm's yield by the time it is connected to the user if that user is too far away. e-Tree projects can be installed closer to the user in many cases and thereby mitigate the transmission line problem. For truly remote installations of large (MW output) e-Trees projects, there must be sufficiently developed transmission line infrastructure. This is of course a problem for traditional wind turbines as they are often required (for aesthetic, zoning and safety reasons) to be far removed from their customers.

Careful planning is necessary if an e-Tree farm is to be cost effective. But in many cases, these installations can be the only reasonable way to locally generate electrical power (e.g., one or two PRG installations that provide power to charge suburbanites' plug-in hybrid automobiles). In many cases net metering regulations allow the owner of an e-Tree installation to be paid for electricity supplied to the local electrical grid. The scale of an e-Tree installation can vary between those utilizing only a few trees (generating a few hundred watts) and those utilizing many thousands of trees (generating hundreds of KWs or even MWs). This new technology requires very little infrastructure, the process of installing an e-Tree farm makes use of little machinery and has little impact on the trees and on the local ecology. Maintenance is handled by e-Tree "forest rangers." These rangers can be members of the indigenous population who shepherd the e-Tree farms by tending to the health of the trees (trimming, thinning and readjusting the PRG harnesses) and maintaining the equipment.

e-Tree technology, a distributed system of electrical generators utilizing wind driven natural motion of trees, represents a technology that can be used around the world by individuals and governments interested in producing electricity with minimal environmental impact while mitigating the effects of atmospheric carbon dioxide and contributing to the fight against global warming.

DESCRIPTION OF PRIOR ART

There is no prior art relevant to this invention, a distributed system of electrical generators utilizing wind driven natural motion of trees. There are renewable energy systems powered by wind turbines, by water waves, by human movement and even by the small movements of transportation bridges, but no approach until now makes use of wind driven swaying trees or large networks of small generators powered by swaying trees.

SUMMARY

This invention, a distributed system of electrical generators utilizing wind driven natural motion of trees, derives electricity from the natural swaying of trees in a windy environment. By suspending pull-retract generators between neighboring trees, this distributed network of generators is capable of producing a useful amount of electricity with little impact on the environment. Further, because the invention utilizes trees in their natural habitat, the benefit to the environment is magnified—power is generated, carbon is sequestered, ecosystems are left essentially undisturbed, and the beauty of the land is preserved. This invention can be employed in both remote and urban areas, it produces power in both turbulent and steady state winds, and it requires very little infrastructure to install and maintain.

The primary object of this invention, therefore, is to provide a new and improved electrical power generating system consisting of a distributed network of generators actuated by the relative motion of trees subject to windy conditions.

An important object of this invention is to provide a new and improved power generating system which is of simple construction and will operate with a minimum of attention and with minimal environmental impact.

Another important object of this invention is to provide a design for a pull-retract generator device that converts relative tree motion into rotational energy that powers an electrical generator.

Other objects and many advantages of this invention will become more apparent upon a reading of the following detailed description and an examination of the drawings.

We are aware that numerous details of construction, network design, mechanical design, electrical design and installation may be made throughout a reasonable range without departing from the principles disclosed herein and we therefore do not propose limiting the patent granted hereon otherwise than as necessitated by the appended claims.

DRAWINGS

FIG. 1, page 23: Networks of PRGs, configured in different situations
 1. Schematic representation of PRGs attached to trees (2.)
 2. Trees used to support (by trees saddles, see FIG. 8) PRGs
 3. Rack and pinion cables that attach to one point saddles (FIG. 8) and mesh with pinion gear within a PRG.
 4. Safety cable supporting PRG.
 5. PRG—pull-retract generator
 6. Tree subject to winds
 7. Electrical conditioning unit (regulator and inverter)
 8. Tree subject to winds
 9. Rack and pinion cable from PRG, indicating possibility of 2 PRGs/tree
 10. Multiple PRGs attached to centrally located large, rigid tree
 11. Large, rigid tree supporting multiple PRGs tethered to several neighboring smaller trees
 12. Rack and pinion cable from PRG
 13. Small, flexible trees networked to larger, rigid tree FIG. 2, page 24: PRG diagram, side view schematic
 1. Rack and pinion, spring-chain cable
 2. Rack and pinion, spring-chain guide
 3. Pinion and large gear set, meshing with rack and pinion, spring-chain assembly
 4. Connector for safety support cable
 5. Axle on which the small-large gear sets rotate
 6. Connector for side support cable
 7. Small-Large gear set (ratio 1:N)
 8. One-way clutch, small-large gear set (ratio 1:N)
 9. Frame containing inner workings of PRG
 10. Connector for side support cable
 11. Output from generator, in case of DC output a rectifier is required
 12. Generator, AC or DC
 13. Small gear attached to generator shaft and meshing with final large gear
 14. Bottom base, supporting axle bases and generator
 15. Axle with separators maintaining proper spacing between gear sets
 16. Large gear in a gear set
 17. Small gear in a gear set FIG. 3, page 25: PRG diagram, side view
 1. Pinion gear
 2. Rack and pinion, spring-chain
 3. Rack and pinion, spring-chain guide
 4. One-way clutch small-large gear set
 5. Axle and spacer
 6. Rectifier, in case of DC output
 7. Small gear attached to generator shaft
 8. Generator, AC or DC
 9. Generator shaft 10. Frame containing inner workings of PRG
11. Large gear of a small-large gear set
12. Small-large gear set
13. Small-large gear set
14. Axle and spacer FIG. 4, page 26: PRG diagram, top view, two-axle version
1. Rack and pinion, spring-chain
2. Rack and pinion, spring-chain guide
3. Large gear
4. Small gear (pinion and others)
5. Small gear
6. Axle
7. Connectors for support cables
8. Frame containing the inner workings of PRG (weather proof)
9. Small gear attached to generator shaft
10. Generator shaft FIG. 5, page 27: Rack and Pinion, spring-chain cable
1. Axle supporting pinion-large gear set and other small-large gear sets
2. Pinion gear
3. Chain
4. Spring for maintaining tension in chain as trees sway
5. Cable ending at one end in T-connector that attaches to spring and chain and ending at other end connected to safety release link and one-point saddle
6. Going to safety release link and one-point saddle
7. T-connector FIG. 6, page 28: PRG diagram, top view, three-axle version
1. Rack and pinion, spring-chain
2. Rack and pinion, spring-chain guide
3. Large gear
4. Small gear
5. Large gear
6. Small gear
7. Axle
8. Frame containing inner workings of PRG (weather proof)
9. Generator shaft
10. Small gear attached to generator shaft FIG. 7, page 29: Single Point and Double Point Tree saddle (harness), various views
1. Eyelet connectors on two-point tree saddle
2. Tree saddle material, strong, durable and re-enforced
3. Goes to one-point tree saddle
4. Support safety cable
5. Spring component of rack and pinion, spring-chain
6. Rack and pinion cable, connects to safety release link and one-point tree saddle
7. Chain component of rack and pinion, spring-chain
8. Output wiring from generator to controller and ground
9. Support cables
10. Two-point tree saddle
11. Eyelet connecting support cable
12. PRG
13. Safety release link
14. Safety release mechanism
15. One-point tree saddle FIG. 8, page 30: Electrical system schematic
1. Wiring connecting the output from multiple PRGs
2. Lightning arrestor to limit damage to PRGs from lightning strikes to network (commercial)
3. Voltage regulator that conditions, filters and voltage limits the PRG output (commercial)
4. Fuse to control current drain (commercial)
5. Battery that a user might wish to charge
6. Shunt that directs output to battery or other DC load (commercial)
7. DC load to be determined by user
8. AC load to be determined by user
9. Fuse (commercial)
10. Inverter to convert DC into AC at required voltage and frequency (commercial)

DETAILED DESCRIPTION

Figure 1:
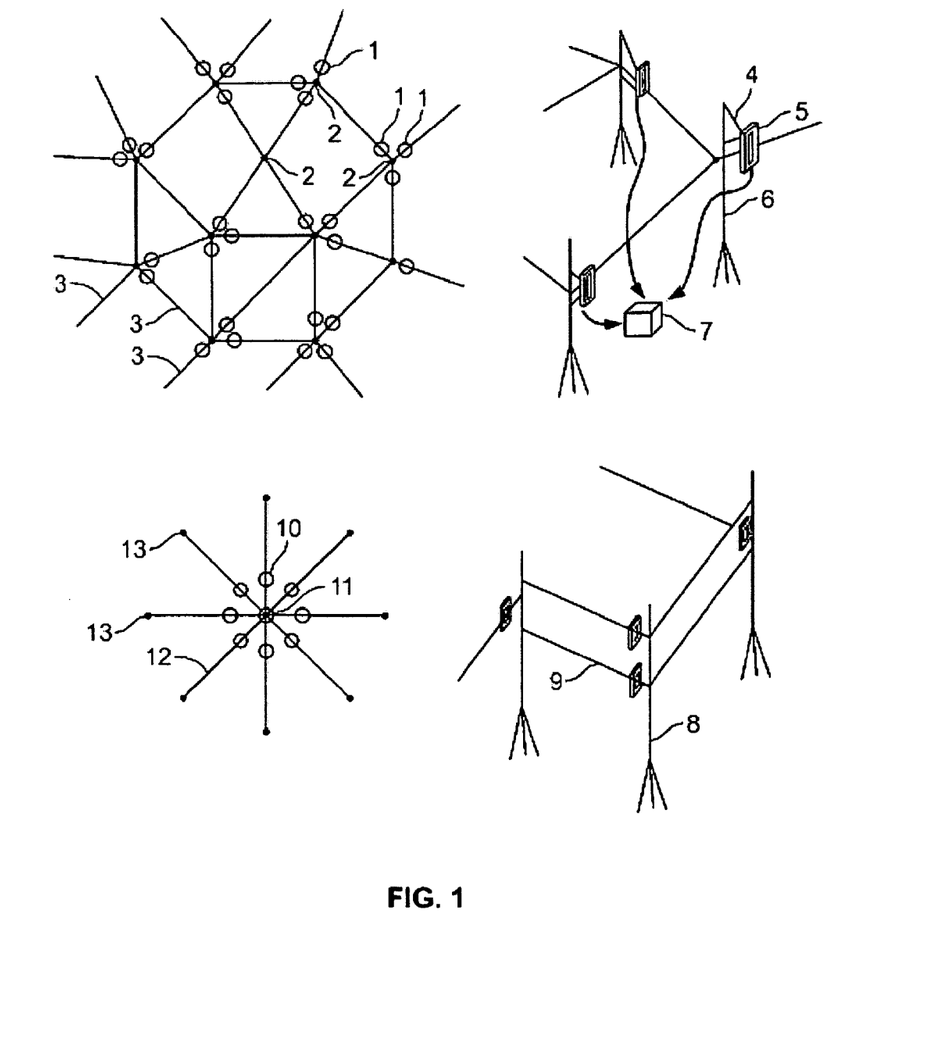
Figure 2:
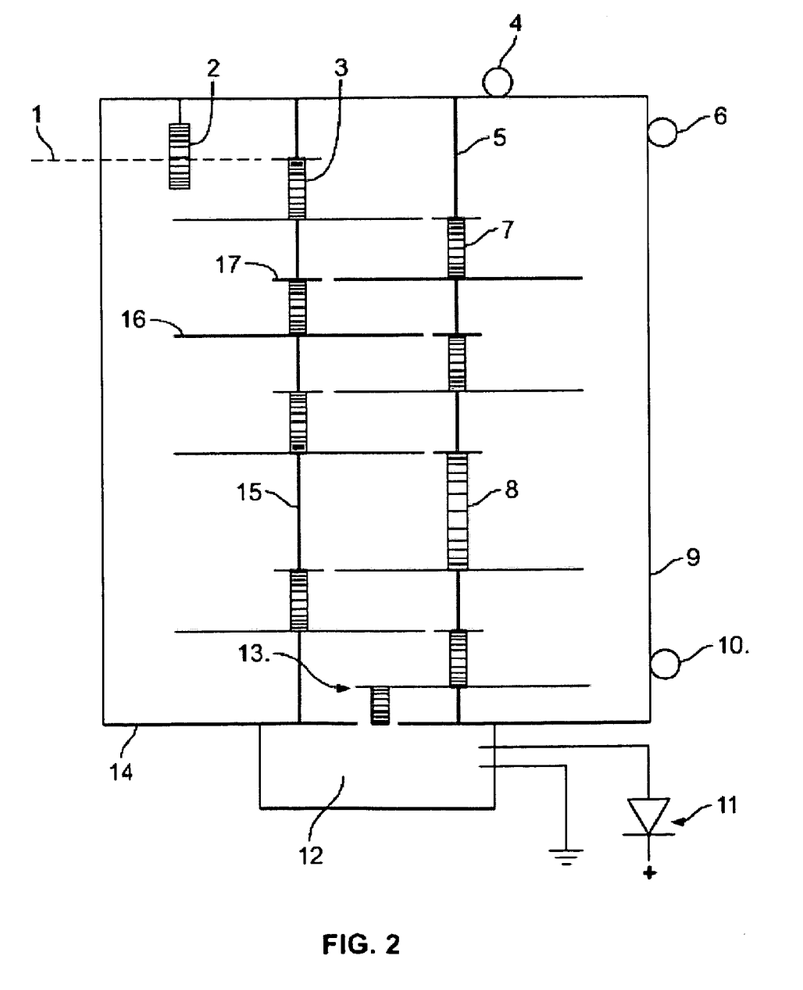
Figure 3:
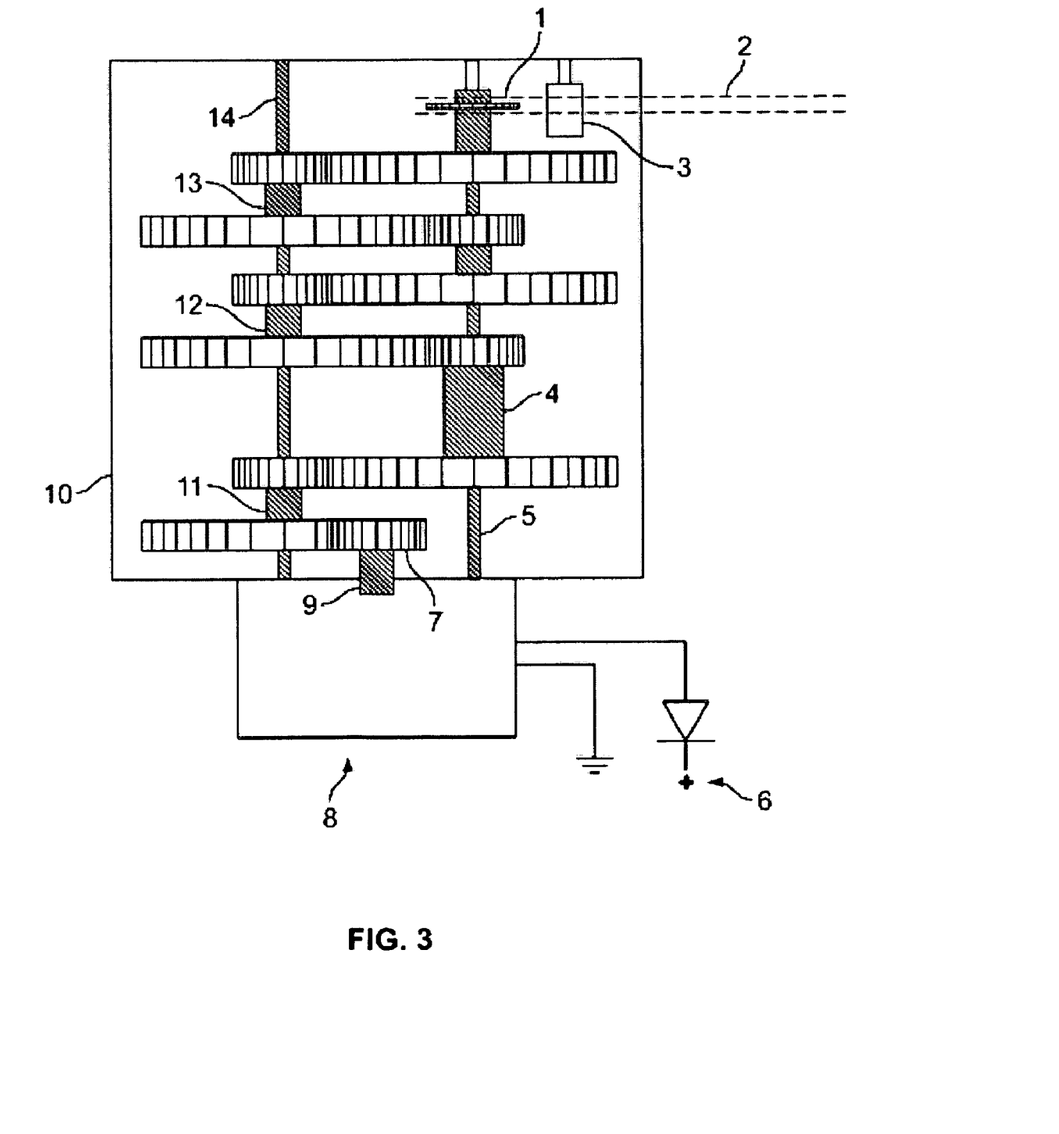
Figure 4:
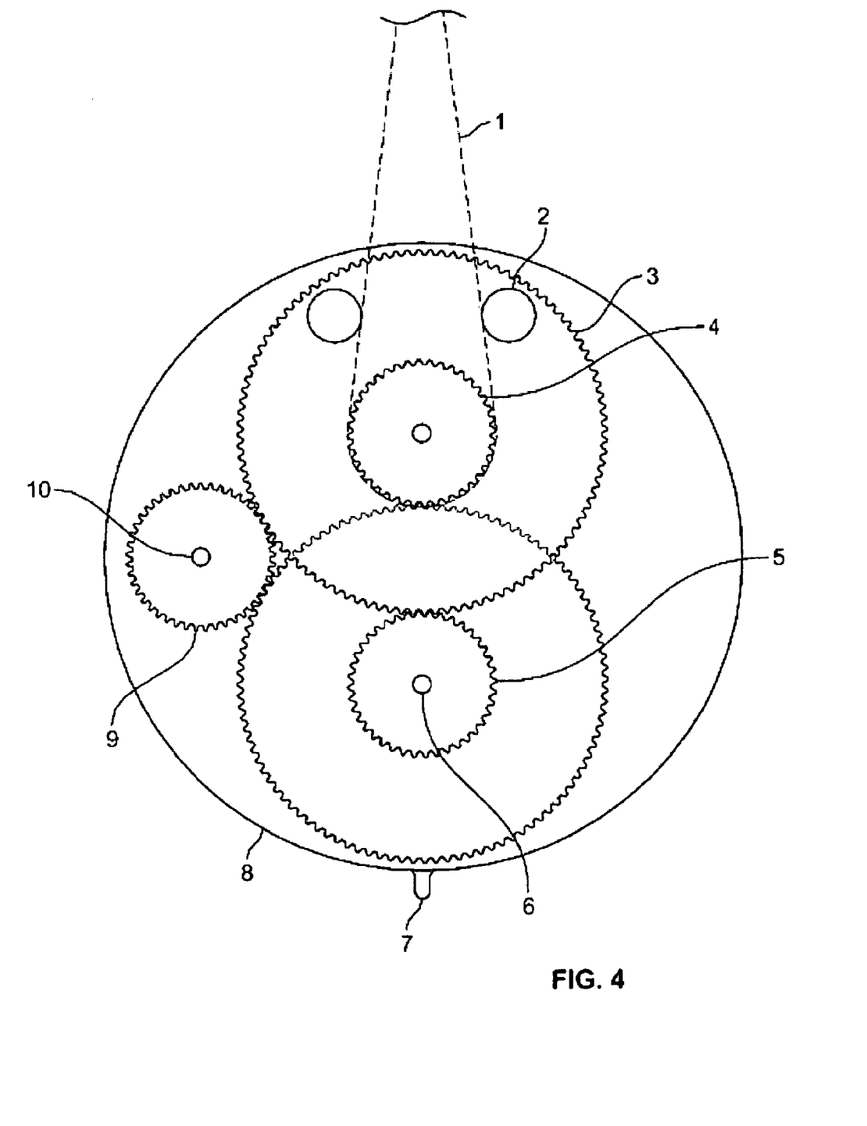
Figure 5:
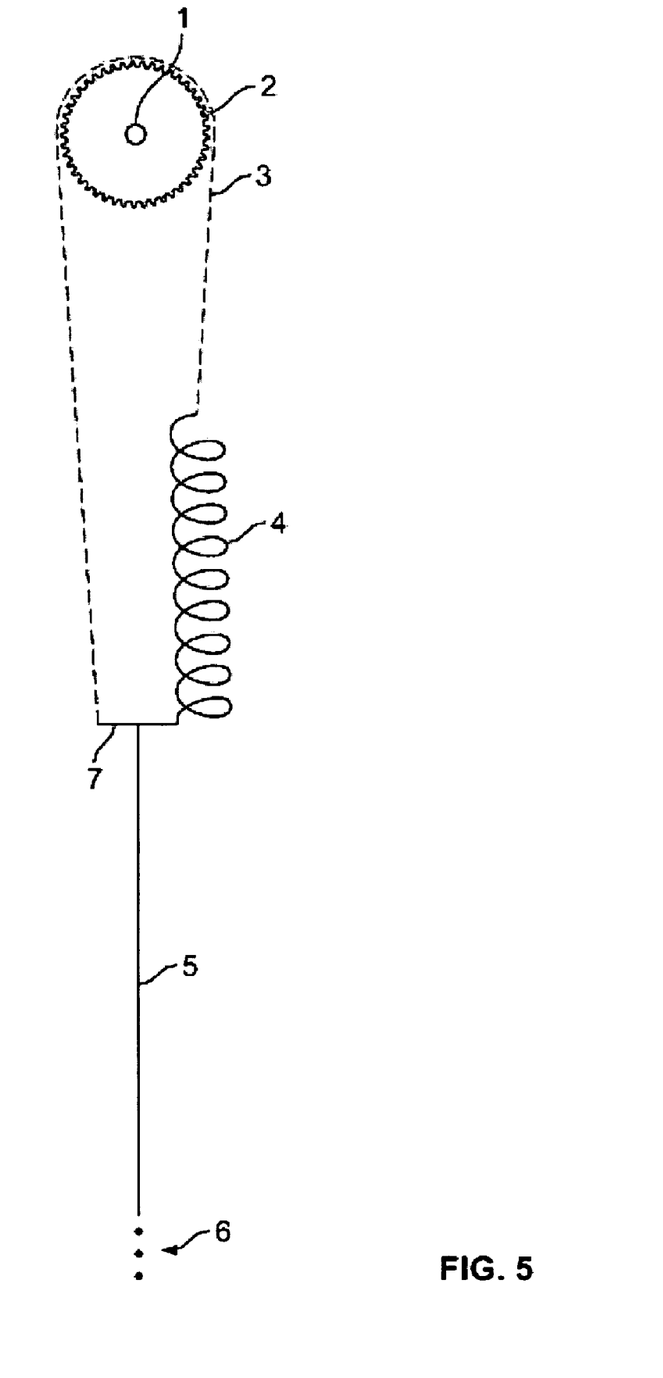
Figure 6:
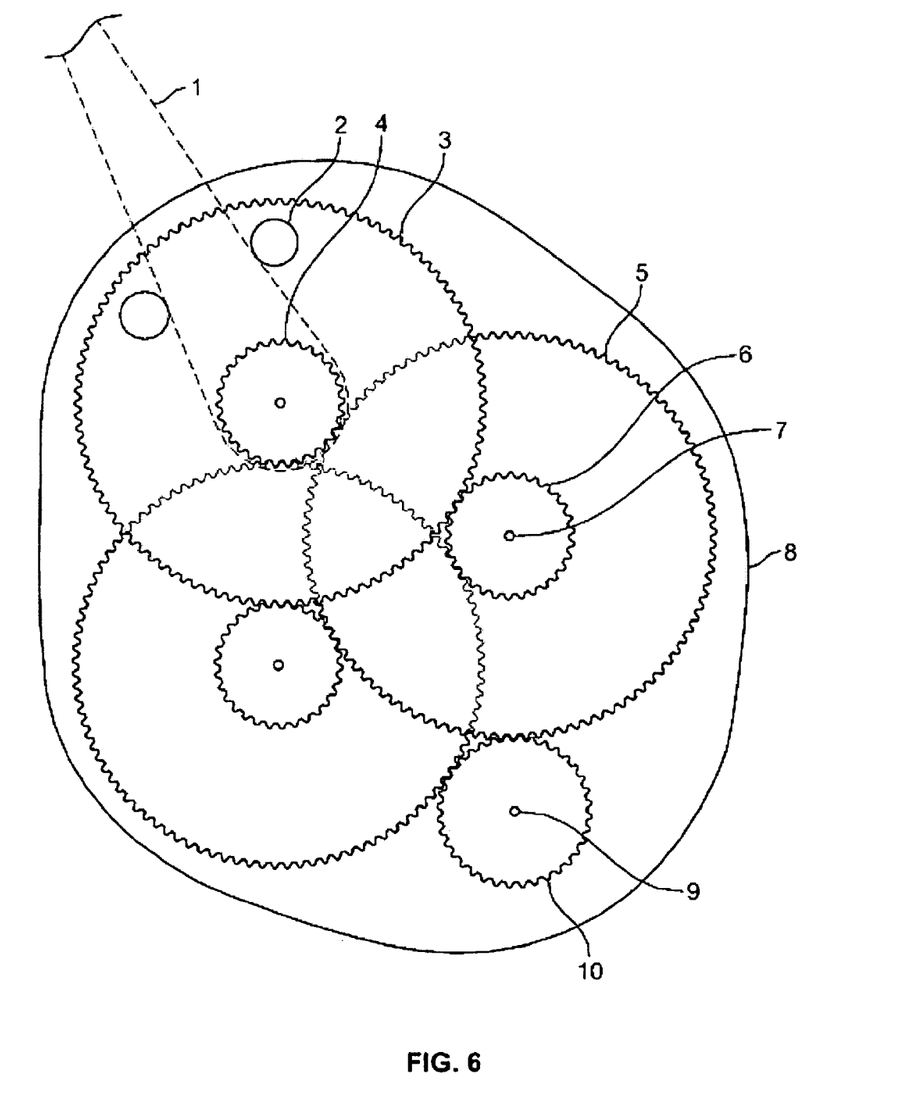

FIG. 1 are schematic diagrams of examples of how various stands of trees might be networked or "farmed" and of how the pull-retract generators (PRGs) might be configured. Points 1.-3. refer to a system that presumes all trees are of the same species and more or less of the same age, size and flexibility. These trees would be trimmed (i.e., some branches might be cut and some smaller trees may be removed) so that their saddles could all be located at a uniform height and the distribution of PRGs would be that of a fairly uniform lattice. Points 10.-13. refer to a possible configuration for a stand of trees that includes some older, larger trees and others that are young, the older and larger more rigid and the younger and thinner more flexible. Points 8.-9. show how tall trees might support multiple PRGs. Coppiced units can be farmed separately. As is nature, the variety of e-Tree farm configurations is unlimited.

FIG. 2-FIG. 6 are diagrams of a pull-retract generator (PRG) and some of its components. The overall size and shape of a PRG is that of a cylinder with 15 inch diameter and 18 inch height—but there is no real constraint on making the PRG smaller or larger, it depends on the application. The function of the PRG is to convert the small, periodic, expanding and contracting separation between neighboring trees (the relative motion of neighboring trees) into torque and then use that torque to create sufficient rotational speed to power an AC or DC generator (most projects will call for a DC generator with a rectifier, but some smaller applications may require an AC generator). The PRG design utilizes a type of chain driven (FIG. 5.3), cable (FIG. 5.5) and spring-supported (FIG. 5.4), flexible rack and pinion (FIG. 5) construction to achieve the initial conversion of relative tree motion into rotational motion (through the pinion gear (FIG. 5.2)) to power the rest of the PRG. As two neighboring trees that are attached to a PRG and its rack and pinion cable sway, they move further apart and closer together in an essentially periodic way. The rack and pinion, spring-chain assembly (FIG. 5) will stretch and contract (the tension maintained by the spring (FIG. 5.4) attached to the cable at the T-connector (FIG. 5.7) and to the chain rack (FIG. 3.3) which, following its meshing with the teeth of the pinion gear (FIG. 3.2) returns to the T-connector) and in doing so the chain will ride back and forth along the pinion gear, rotating it back and forth at a speed commensurate with the stretching and contracting of the separation between the trees. The pinion gear is small and rigidly attached to a larger gear (ratio 1:N) and together this gear set (FIG. 2.3) rotates on one of several axles (FIG. 2.5) that support this and other gear sets (if two axles are used than the gear sets are divided up among the two axles (FIG. 4), and if three axles are used then the gear sets are divided up among the three axles (FIG. 6.)). Each gear set is separated from other gear sets by spacers (FIGS. 3.5, 3.14) that are incorporated into the axle. A variable number of such small-large gear sets may be so used. The larger gear of one gear set is configured to mesh with a smaller gear (N:1) of another gear set which is itself rigidly attached to a larger gear (1:N). This larger gear meshes with a smaller gear (N:1). This configuration continues as needed to generate sufficient RPM at the generator. After several small-large gear sets, a smaller gear is rigidly attached to a larger gear (1:N) through a one-way clutch (FIG. 2.8), i.e., torque is transferred in only one rotational direction. The one-way clutch gear set is commercially available (all multi-geared bicycles make use of such gear sets, there called free-wheels). No attempt has been made to show the details of these one-way clutches as they are old in the art. A recent design is available, e.g., U.S. Pat. No. 7,147, 091). Following the one-way clutch gear set it is possible for more rigid small-large gear sets to be interposed to achieve even higher RPMs, finally resulting in the large gear of the final set meshing with a small drive gear (FIG. 2.13) attached to the shaft of a small generator (FIG. 2.12), AC or DC (for a specific example of M small-large gears being used, the final ratio of pinion RPM to generator RPM is $1:N^M$). With sufficiently many small-large gear sets it is possible to amplify even small inter-tree motions, e.g., ½ inch per tree per second, into rotational speeds (divide linear rate by (small gear radius)×2×PI), of for instance 18,000 RPM, capable of generating 1 KW of DC power from a small generator—for instance, use small gear radius=1 in., large gear radius=N=5 in., and number of small-large gear sets=M=5 to easily achieve sufficient RPM with linear spacing rate of ½ in per second, an effect easily observed in 20 meter tall trees with wind speeds of 5-10 mph). If the generator (FIG. 2.12) produces DC power, then a rectifier (FIG. 2.11) is required on the positive output to guarantee that current does not flow backwards into PRGs that are producing less power than others in their local network. It is of course not necessary to size all gear sets so uniformly nor to have the rigid spacing between the small and large gears of a set uniformly sized, we did so here for simplicity and without any loss of generality in the design of the PRG. In the drawings comprising FIG. 2-6 some variations are considered.

Rack and pinion, spring-chain assembly guides (FIG. 3.3) are required to keep the chain meshing with the pinion gear as the trees sway. Lateral motion will cause the PRG to move and the cable lags can cause the chain to de-rail from the pinion gear if it is not kept in alignment. Not shown is a weather-proof covering for the PRG, but such would be required for commercial development. Depending on the observed, average relative motion of the trees in an installation, the number of small/large gear sets within the PRG being used can be optimally determined. The wiring from the PRG to a system that integrates, inverts and transforms the electricity requires a rectifier so that current does not flow backwards into the PRG. The integrating, inverting and controlling electrical units are part of prior art and are commercially available.

Figure 7:
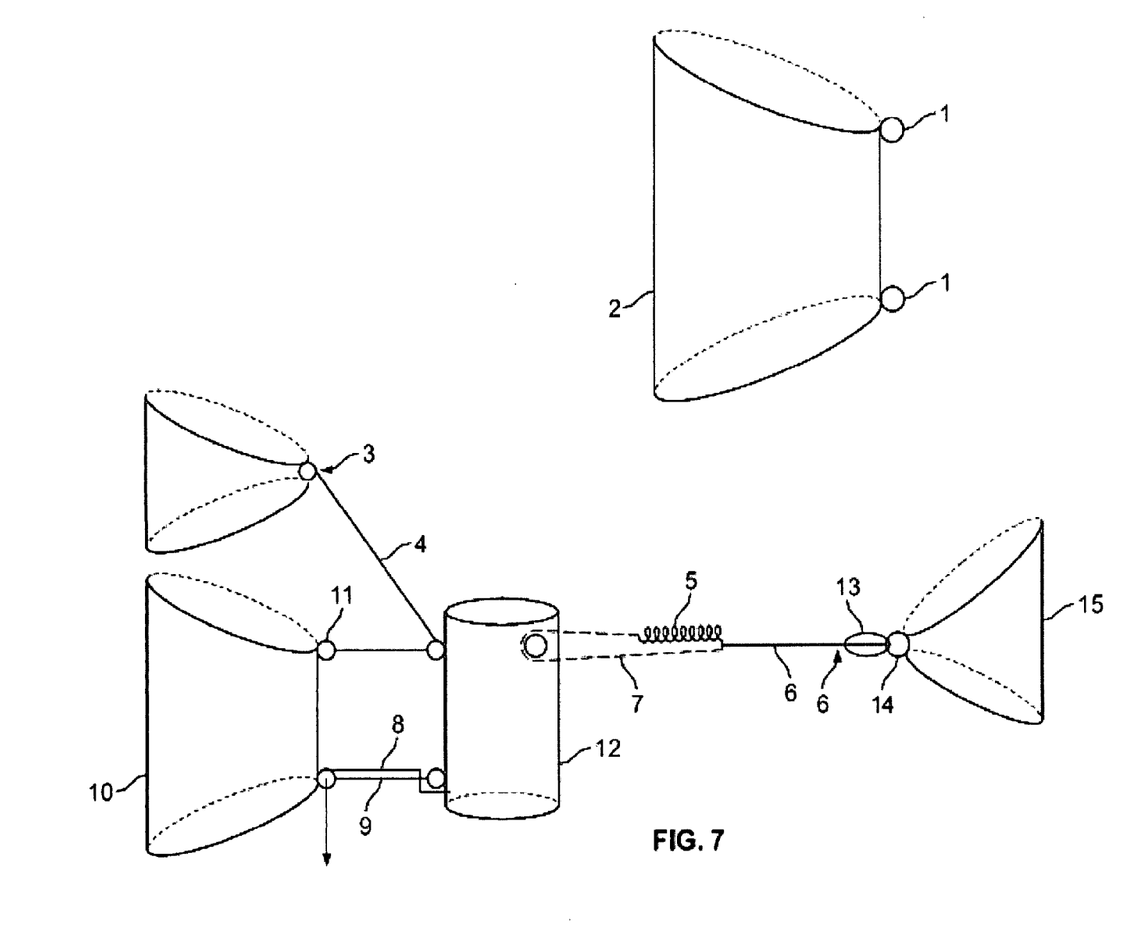

FIG. 7 are diagrams of the tree saddles (one and two point) and attached cables (rack and pinion, support and safety). The basic saddles, FIG. 7.2 and FIG. 7.15, are sling shaped of non-stretchable, durable material that wraps around the tree coming together at one or two points from which the cables to the PRG are connected. Each PRG is connected to three such slings, one on each tree between which the PRG is suspended. Further the safety cable (FIG. 7.4), attached to the PRG (FIG. 7.12) and to a single point tree sling (FIG. 7.3) higher up (than the PRG-supporting, two point saddle) on the closer, supporting tree. This cable is present to keep the PRG from falling when the safety release mechanism, (FIG. 7.14) disengages. The safety release link is a simple link that connects the rack and pinion cable (FIG. 7.6) to the single point tree saddle and is designed to break or release when the tension exceeds a design threshold. Typically, the PRG mechanism will be located very near to one of the two neighboring trees and the rack and pinion cable will span the larger distance to the other tree.

FIG. 7 points 13.-15. are diagrams of the safety release link (FIG. 7.13) as it attaches through the eyelet of the single-point tree saddle (FIG. 7.15). It is designed to disconnect one tree saddle from the PRG unit when the separation between the trees exceeds the designed tolerance or when some other accident occurs (e.g., a branch or neighboring tree falls and strikes the PRG or cabling). The design of each component of the e-Tree system emphasizes simplicity. The PRG cable, FIG. 7.7 and FIG. 7.5, connects to a tree saddle using a safety link (FIG. 7.13) on one end, connects to a spring (FIG. 5.4) at the T-connector (FIG. 5.7) which then connects to the rack chain (FIG. 5.3) and loops back on itself (FIG. 5), after the chain meshes with the pinion gear of the PRG to attach to the T-connector (FIG. 5.7), which is old in the art and readily available in a variety of designs. The safety link connector (FIG. 7.13) simply has to release (to break) when the tension exceeds a design threshold. The threshold is determined by the specifications of the spring tension. When the separation between the trees exceed safely limits (or some other event increases the cable tension beyond its design tolerance), the safety release, FIG. 7.13, breaks and the spring/chain-side (FIG. 7.6) of the PRG cable is disconnected from the tree saddle. The PRG falls but remains suspended by the cables that are attached to the other tree saddle and by the additional safety cable, FIG. 7.3. Reconnecting the released PRG is easily done after the traumatic event is over.

Figure 8:
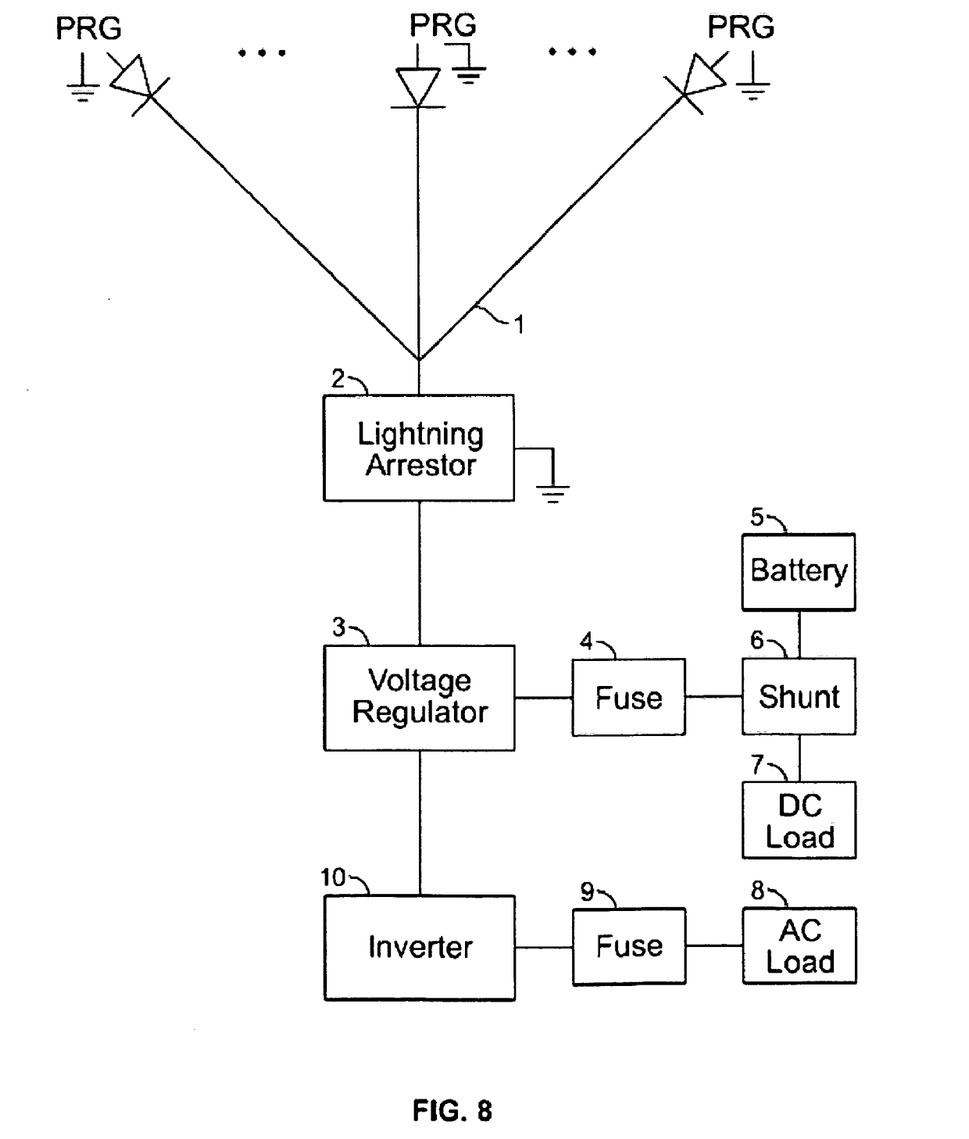

FIG. 8 is a schematic diagram of the electrical system utilized by an e-Tree installation. These electrical control systems are not to be considered as part of the scope of the patent but are devices that are readily available on the commercial market (as the units an e-tree installation will utilize are identical to those already in use by small wind turbine installations). Generally speaking, the positive outputs of sets of PRGs (which have passed through rectifiers) are joined together (FIG. 8.1) and connected to a lightning arrestor (FIG. 8.2) which is an established commercial product and prior art, and then to a voltage regulator (FIG. 8.3) which is an established commercial product and prior art, a fuse (FIG. 8.4) which is an established commercial product and prior art, a shunt (FIG. 8.6) which is an established commercial product and prior art and which can, if desired be used to direct DC output to a battery (FIG. 8.5) for charging or another DC load (FIG. 8.7) for consumer use, an inverter (FIG. 8.10) which is an established commercial product and prior art, whose function it is to convert AC from DC input, a fuse (FIG. 8.9) and then to an AC load (FIG. 8.8) (e.g., a local user or the local electrical grid).

What is claimed is:
1. An electrical power generating system comprising:
   at least one pull-retract generator suspended between two trees;
   a first saddle and a second saddle, wherein each saddle attach at least one pull-retract generator cable to trunks of the trees;
   a rack and pinion mechanism for providing tension to a rack cable connecting one of the saddles to the at least one pull-retract generator;
   a safety cable connecting at least one pull-retract generator to at least one of the saddles; and
   a safety release link connector that allows the rack cable connected to the at least one pull-retract generator to be released when a set threshold tension is reached.

2. An electrical power generating system comprising:
- at least one pull-retract generator attached by at least one support cable to a first saddle in engagement with a first tree; and
- at least one rack and pinion assembly comprising a rack and pinion cable connecting the at least one pull-retract generator to a second saddle in engagement with a second tree,
- wherein the at least one pull-retract generator derives actuating torque from a natural motion of at least one of the first tree and the second tree.

3. The electrical power generating system according to claim 2, further comprising at least one safety cable connected to the at least one pull-retract generator and the first tree.

4. The electrical power generating system according to claim 3, further comprising a safety release link connecting the rack and pinion cable to the second saddle, wherein the safety release link is configured to release when a set threshold tension is reached.

5. The electrical power generating system according to claim 2, wherein the at least one pull-retract generator comprises a pinion gear adapted to connect with the rack and pinion cable is connected.

6. The electrical power generating system according to claim 2, further comprising at least one safety cable connected to the at least one pull-retract generator and the first tree.

7. An electrical power generating system
- a first saddle in engagement with a first tree;
- a second saddle in engagement with a second tree;
- at least one pull-retract generator connected to the first saddle by at least one support cable;
- a rack and pinion mechanism comprising a rack cable connecting the at least one pull-retract generator to the second saddle; and
- a safety release link connector that allows the rack cable to be released when a set threshold is reached.

* * * * *